(12) United States Patent
Kim

(10) Patent No.: US 6,698,881 B1
(45) Date of Patent: Mar. 2, 2004

(54) PIVOTABLE SUNSHADE CLIP FOR SPECTACLES

(76) Inventor: Kyu-Sin Kim, 21-1, 3-Ga, Nowon-Dong, Buk-Gu, Taegu (KR)

( * ) Notice: Subject to any disclaimer, the term of this patent is extended or adjusted under 35 U.S.C. 154(b) by 0 days.

(21) Appl. No.: 10/445,803

(22) Filed: May 28, 2003

(51) Int. Cl.$^7$ ................................. G02C 9/00
(52) U.S. Cl. ............................ 351/47; 351/57
(58) Field of Search .................... 351/47, 57, 48, 351/58, 44, 41

(56) References Cited

U.S. PATENT DOCUMENTS 6,474,811 B2 * 11/2002 Liu .............................. 351/47
6,488,372 B1 * 12/2002 Park ............................ 351/47

\* cited by examiner

*Primary Examiner*—Hung X. Dang
(74) *Attorney, Agent, or Firm*—Jacobson Holman PLLC (57) ABSTRACT

Disclosed herein is a pivotable sunshade clip for spectacles. The sunshade clip comprises a pair of lens frames, a pair of actuating members attached to the lens frames, the actuating member being outwardly extended from outer ends of the lens frames, respectively, and a pair of lever arms attached to the actuating members, the lever arms being extended rearward from the actuating members at right angles to the actuating members, respectively. Each of the actuating members is provided at the rear part thereof with a magnet, which is exposed to the rear surface of each of the actuating members. Each of the lever arms is provided at the lower part thereof with another magnet, which is exposed to the lower surface of each of the lever arms. Each of the coupling members has a spectacles magnet penetrating from a front surface to a rear surface thereof.

4 Claims, 7 Drawing Sheets

PIVOTABLE SUNSHADE CLIP FOR SPECTACLES

BACKGROUND OF THE INVENTION

1. Field of the Invention

The present invention relates to a sunshade clip for spectacles, and more particularly to a pivotable sunshade clip for spectacles, which can be stably attached to the spectacles not only when in use but also when not in use.

2. Description of the Related Art

As well known to those skilled in the art, various kinds of sunshade clips, each of which can be detachably attached to spectacles, have been used instead of sunglasses.

Among others, a type of sunshade clip comprising two lens frames, each of which has a colored lens fitted therein, and fixing members or magnets mounted to the lens frames for detachably attaching the lens frames to ordinary spectacles has been proposed long since.

Especially, a sunshade clip with magnets mounted therein, which can be detachably attached to the spectacles by means of the magnets, is well and widely known, various examples of which are disclosed in several Korean patents, US patents, and other foreign patents. Furthermore, various modifications have been made to such a sunshade clip with magnets mounted therein.

Such modified sunshade clips are disclosed, for example, in Korean Patent Unexamined Publication No. 1998-064118, U.S. Pat. No. 5,416,537 to Frank Sadler, U.S. Pat. No. 5,568,207 to Richard Chao, U.S. Pat. No. 5,642,177 to Takahiro Nishihoka, U.S. Pat. No. 5,882,101 to David Yinkai Chao, U.S. Pat. No. 4,070,103 to Meeker, U.S. Pat. No. 5,642,177 to Sunreeve, European Patent No. 1,061,253, and German Patent No. 8,507,761U.

Each of the aforesaid sunshade clips has a magnet mounted to either end of the clip, which is magnetically attached to a magnet mounted in a corresponding bridge or hinge of spectacles and having a magnetic polarity opposite to that of the magnet mounted to the clip.

All of the conventional sunshade clips have problems, however, in that they must be detached from the spectacles and safely kept in other places when they are not used and they must be attached again to the spectacles when they are to be used.

Especially, each of the sunshade clips has no arms. Consequently, the entire structure of the sunshade clip is weak and frail, and safe keeping of the sunshade clip is difficult and troublesome. For this reason, a case for safely keeping the sunshade clip is also provided to a user of the sunshade clip. However, safe keeping of the case is also difficult and troublesome.

SUMMARY OF THE INVENTION

Therefore, the present invention has been made in view of the above problems, and it is an object of the present invention to provide a pivotable sunshade clip for spectacles that can be detachably attached to the spectacles with ease and simply stored when not in use.

It is another object of the present invention to provide a pivotable sunshade clip for spectacles that can be pivoted upward or not on the basis of a user's environment, thus increasing its adaptability to various environments.

It is yet another object of the present invention to provide a pivotable sunshade clip for spectacles that can be easily pivoted upward whenever it is to be used, thus increasing a user's convenience.

In accordance with the present invention, the above and other objects can he accomplished by the provision of a pivotable sunshade clip for spectacles having a pair of coupling members, the sunshade clip comprising: a pair of lens frames; a pair of actuating members attached to the lens frames, the actuating member being outwardly extended from outer ends of the lens frames, respectively; and a pair of lever arms attached to the actuating members, the lever arms being extended rearward from the actuating members at right angles to the actuating members, respectively, wherein: each of the actuating members is provided at the rear part thereof with a magnet, the magnet being exposed to the rear surface of each of the actuating members; each of the lever arms is provided at the lower part thereof with another magnet, the magnet being exposed to the lower surface of each of the lever arms; and each of the coupling members has a spectacles magnet penetrating from a front surface to a rear surface thereof, the spectacles magnet alternately making contact with the magnet of each of the actuating members and the magnet of each of the lever arms, the spectacles magnet having a magnetic polarity opposite to that of the magnet of each of the actuating members and to that of the magnet of each of the lever arms, whereby the sunshade clip is pivoted upward or downward about a pair of lever faces as fulcrums for the lever arms, by means of increased magnetic attraction between the magnets of the lever arms of the sunshade clip and the corresponding spectacles magnets of the coupling members of the spectacles or between the magnets of the actuating members of the sunshade clip and the corresponding spectacles magnets of the coupling members of the spectacles, each of the lever faces being formed on each of the coupling members, the lever arms being placed on the lever faces of the coupling members, respectively.

Preferably, each of the spectacles magnets may have two separated permanent magnet parts, one of the magnet parts being embedded in the coupling member near the front surface of the coupling member so that it makes contact with the magnet of each of the actuating members, the other of the magnet parts being embedded in the coupling member near the rear surface of the coupling member so that it makes contact with the magnet of each of the lever arms.

Preferably, each of the lever arms may be hooked at the top surface of each of the coupling members for serving as a hooked portion when the sunshade clip is pivoted upward or downward in a seesaw fashion.

Preferably, one of the actuating member/lever arm and the coupling member may be made of a metal attractable by the magnet, and the other may have the magnet at the position corresponding to the actuating member/lever arm or the coupling member.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
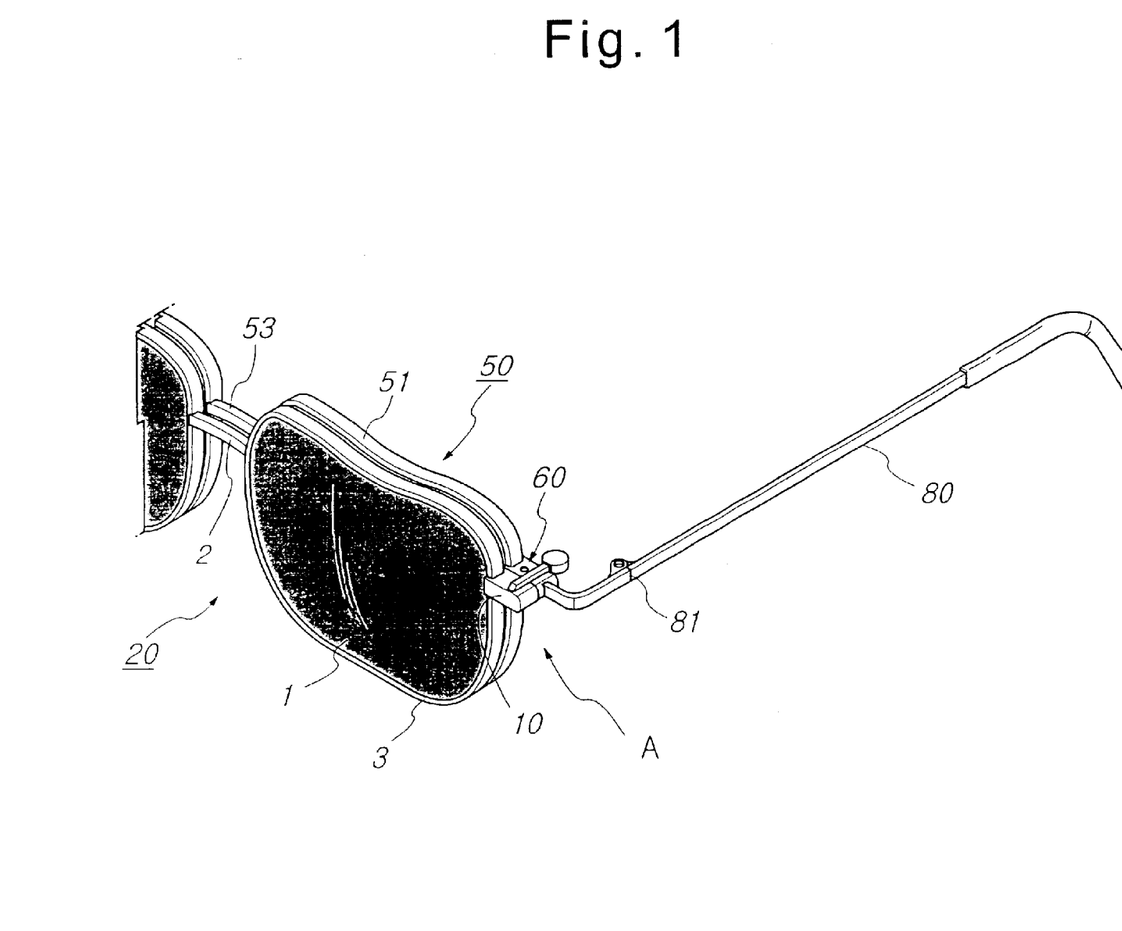
FIG. 1 is a partial perspective view of a pivotable sunshade clip for spectacles according to the present invention showing the sunshade clip attached to the spectacles.
Figure 2:
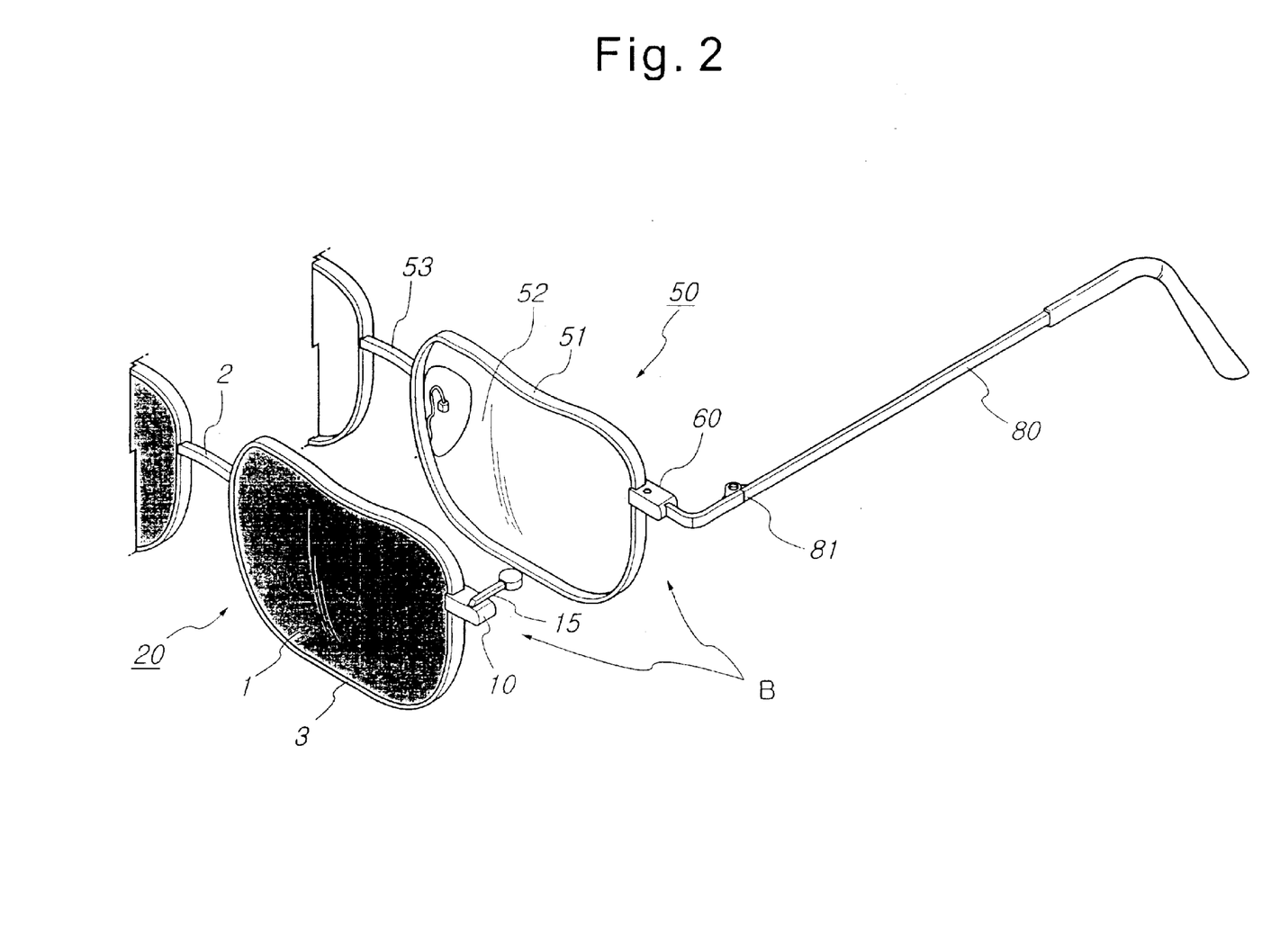
FIG. 2 is a partial perspective view of a pivotable sunshade clip for spectacles according to the present invention showing the sunshade clip detached from the spectacles.
Figure 3:
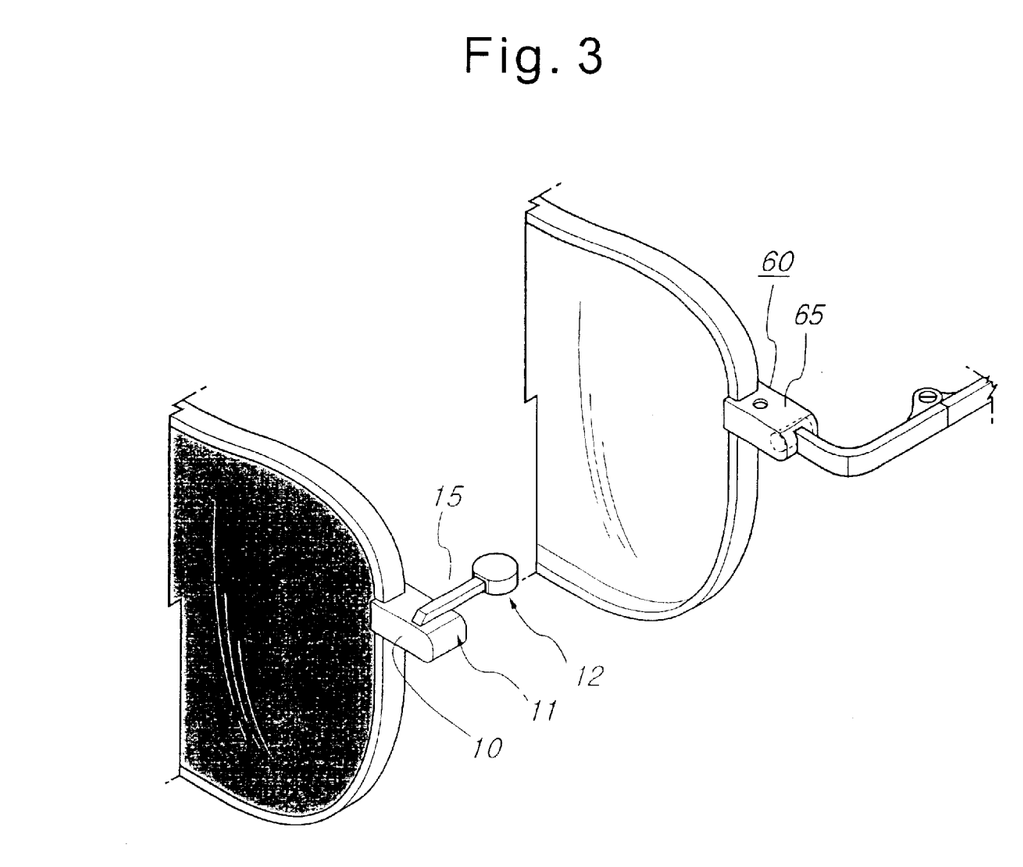
FIG. 3 is an enlarged perspective view of B portion indicated in FIG. 2 showing main parts of the pivotable sunshade clip for spectacles according to the present invention.
Figure 4:
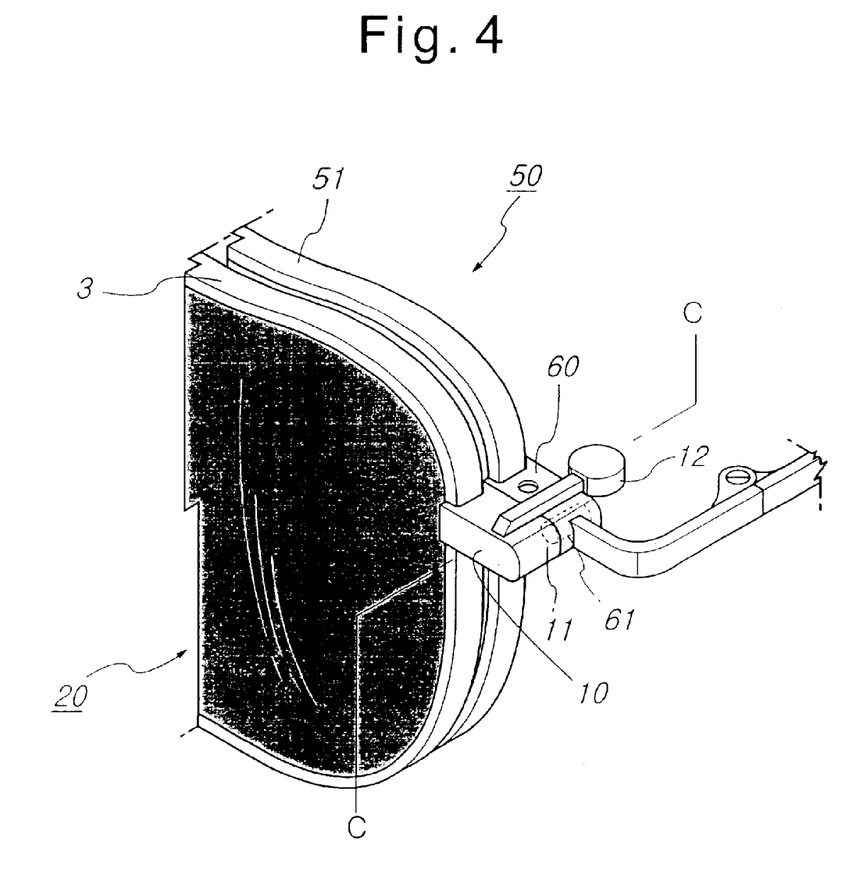
FIG. 4 is an enlarged perspective view of A portion indicated in FIG. 1 showing the pivotable sunshade clip for spectacles according to the present invention attached to the spectacles.
Figure 5:
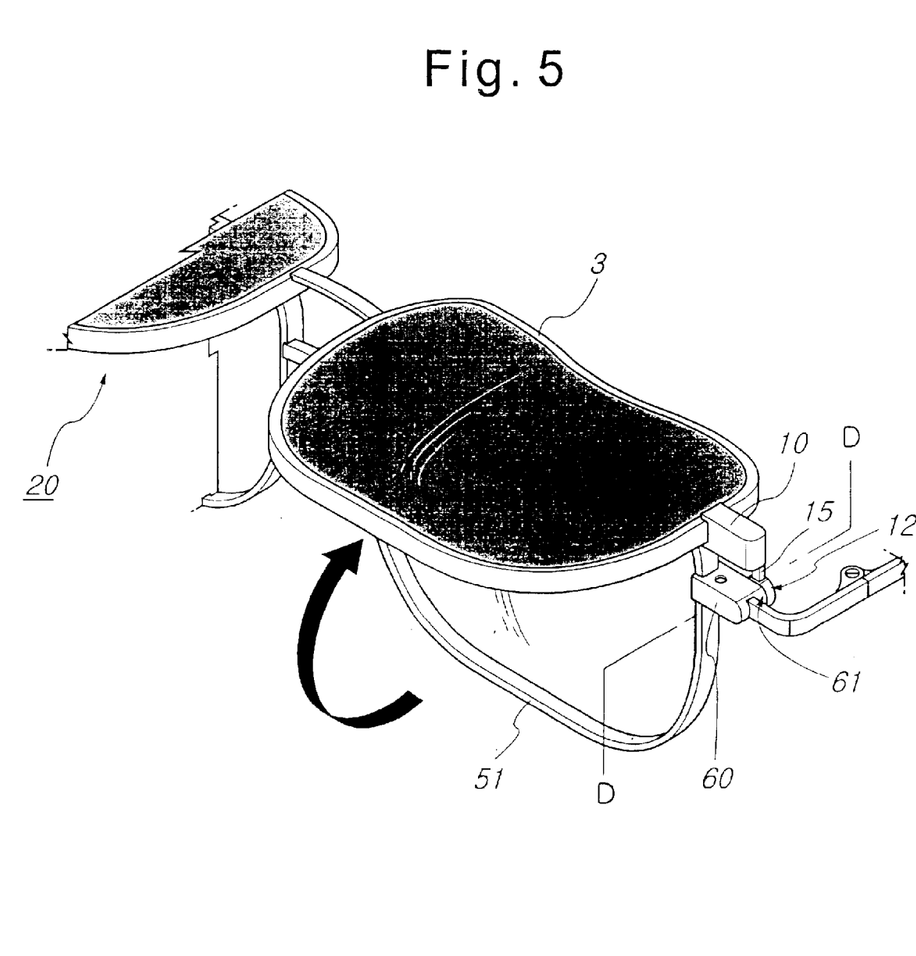
FIG. 5 is a partial perspective view of a pivotable sunshade clip for spectacles according to the present invention showing the upwardly pivoted sunshade clip, when seen in front of the spectacles.
Figure 6:
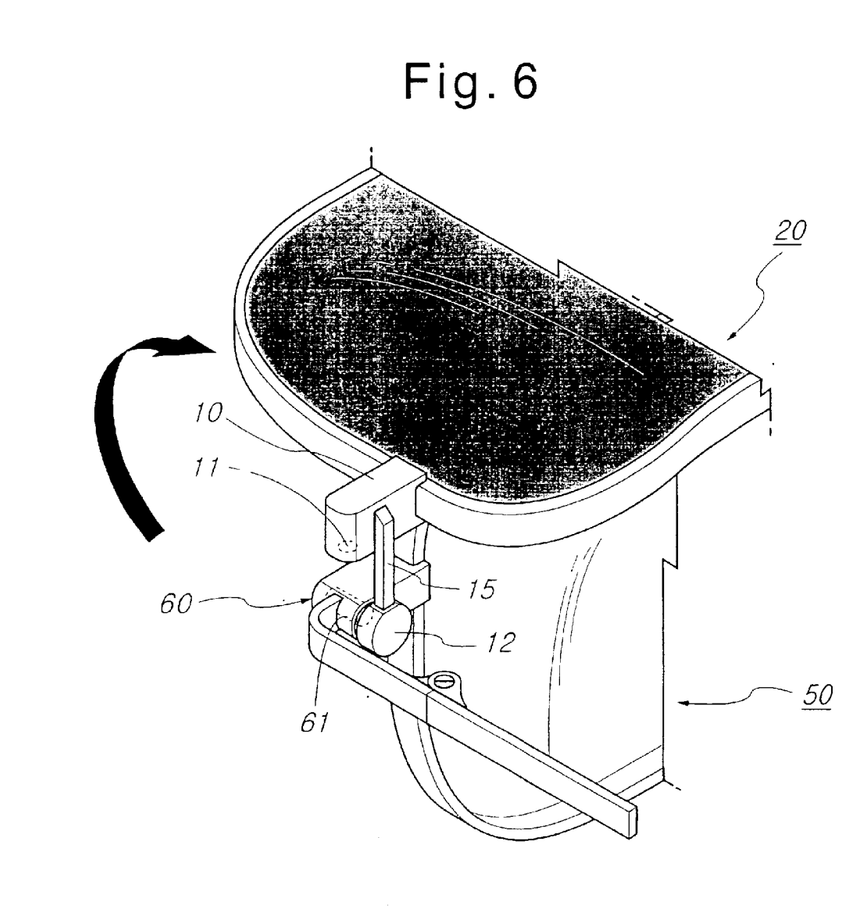
FIG. 6 is a partial perspective view of a pivotable sunshade clip for spectacles according to the present invention showing the upwardly pivoted sunshade clip, when seen from behind the spectacles.
Figure 7:
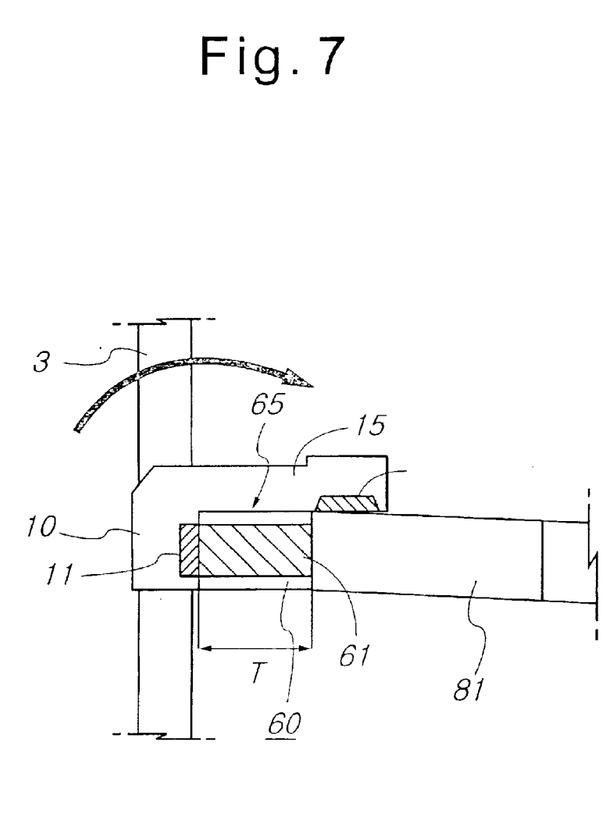
FIG. 7 is a cross sectional view taken along lone C—C of FIG. 4 showing the coupling relation between the spectacles and the sunshade clip which is not pivoted upwardly.
Figure 8:
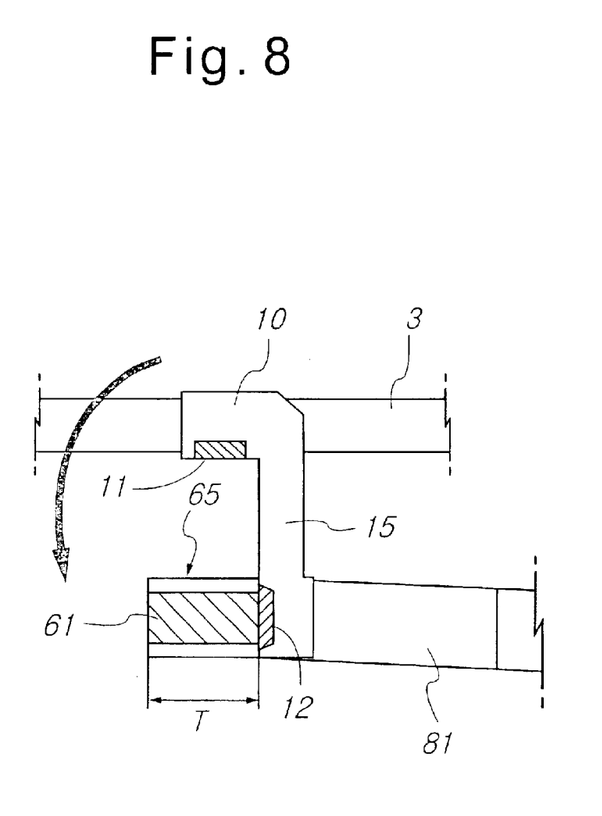
FIG. 8 is a cross sectional view taken along line D—D of FIG. 5 showing the coupling relation between the spectacles and the sunshade clip which is pivoted upwardly.

FIG. 1 is a partial perspective view of a pivotable sunshade clip for spectacles according to the present invention showing the sunshade clip attached to the spectacles, FIG. 2 is a partial perspective view of a pivotable sunshade clip for spectacles according to the present invention showing the sunshade clip detached from the spectacles, FIG. 3. is an enlarged perspective view of B portion indicated in FIG. 2 showing main parts of the pivotable sunshade clip for spectacles according to the present invention, FIG. 4 is an enlarged perspective view of A portion indicated in FIG. 1 showing the pivotable sunshade clip for spectacles according to the present invention attached to the spectacles, FIG. 5 is a partial perspective view of a pivotable sunshade clip for spectacles according to the present invention showing the upwardly pivoted sunshade clip, when seen in front of the spectacles, FIG. 6 is a partial perspective view of a pivotable sunshade clip for spectacles according to the present invention showing the upwardly pivoted sunshade clip, when seen from behind the spectacles, FIG. 7 is a cross sectional view taken along line C—C of FIG. 4 showing the coupling relation between the spectacles and the sunshade clip which is not pivoted upwardly, and FIG. 8 is a cross sectional view taken along line D—D of FIG. 5 showing the coupling relation between the spectacles and the sunshade clip which is pivoted upwardly.

Referring to the aforesaid drawings, especially to FIG. 1, a pivotable sunshade clip 20 for spectacles according to the present invention is attached to spectacles 50. The sunshade clip 50 comprises identical right and left clip parts attached to the corresponding identical right and left parts of the spectacles 50, one of which will accordingly be described hereinafter.

The sunshade clip 20 is detachably attached to the spectacles 50, which is usually made of a metal.

The spectacles 50 comprise lens frames 52 having lens 51 fitted therein and a bridge 53 connected between the lens frames 52. Each of the lens frames 52 is provided at its outer end thereof with a coupling member 60. To the coupling member 60 is attached a hinge 81, which is pivotably connected with an earpiece 80.

As shown in the drawings, the sunshade clip 20 generally comprises lens frames 3 having colored lenses 1 fitted therein and a bridge 2 connected between the lens frames 3. It is to be understood, however, that a sunshade clip 20 without lens frames 3 may be also used. To such a sunshade clip 20 are directly fixed actuating members 10, which will be described later, by means of bolts.

The pivotable sunshade clip 20 for spectacles 50 according to the present invention has the actuating members 10 integrally formed with the lens frames 3 or directly fixed to the lens 1. The actuating members 10 are outwardly extended from outer ends of the lens frames 3 or the lens 1, respectively. Preferably, each of the actuating members 10 is made of a metal. To the top surface of each of the actuating members 10 is attached a lever arm 15, which is extended rearward from the actuating member 10 at a right angle to the actuating member 10.

The lever arm 15 is formed in the shape of an extended leg, as shown in the drawings. Consequently, the actuating member 10 and the lever arm 15 together form an approximate " " shape.

The actuating member 10 is provided at the rear part thereof, i.e., the part closest to the spectacles, with a first clip magnet 11, which is a permanent magnet having a sufficient magnetic force.

The first clip magnet 11 is preferably formed in the shape of a thick disc, and is embedded in the actuating member 10.

Similarly, the lever arm 15 is also provided at the lower part of the free end thereof with a second clip magnet 12, which is a permanent magnet having a sufficient magnetic force. The second clip magnet 12 is preferably formed in the shape of a truncated cone, and is embedded in the lever arm 15. Of course, the second clip magnet 12 may be formed in the same shape as the first clip magnet 11.

It should be noted that the aforesaid first and second clip magnets 11 and 12 are provided at both of the actuating members 10 mounted at both ends of the sunshade clip 20.

The coupling member 60 of the spectacles 50, to which is attached the hinge 81 pivotably connected with the earpiece 80, has a spectacles magnet 61 penetrating from a front surface 60F to a rear surface 60R of the coupling member 60. The spectacles magnet 61 is a permanent magnet having a sufficient magnetic force. The spectacles magnet 61 is preferably formed in the shape of a cylinder.

The front magnetic surface of the spectacles magnet 61, which is exposed to the front surface 60F of the coupling member 60 or embedded in the coupling member 60, makes contact with the first clip magnet 11 of the actuating member 10.

The rear magnetic surface of the spectacles magnet 61, which is exposed to the rear surface 60R of the coupling member 60 or embedded in the coupling member 60, makes contact with the second clip magnet 12 of the lever arm 15.

Alternatively, the spectacles magnet 61 of the coupling member 60 may be divided into two magnet parts, one of which is embedded in the coupling member 60 near the front surface 60F of the coupling member 60. The other is embedded in the coupling member 60 near the rear surface 60R of the coupling member 60.

As best shown in FIGS. 2, 6 and 7, the spectacles magnet 61 is penetrating through the coupling member 60 from the front surface of the coupling member 60 to the rear surface of the coupling 60. The coupling member 60 has a lever face 65 formed thereon. The lever arm 15 is placed on the lever face 65 of the coupling member 60. The lever face 65 serves as a fulcrum for the lever arm 15 when the sunshade clip 20 is pivoted upward, which will be described later. It should be noted that the aforesaid spectacles magnets 61 are provided at both of the coupling members 60 mounted at both ends of the spectacles 50.

The first clip magnet 11 embedded in the actuating member 10 of the sunshade clip 20 has a magnetic polarity opposite to that of the corresponding spectacles magnet 61 at the front surface 60F of the coupling member 60 of the spectacles 50.

Similarly, the second clip magnet 12 embedded in the lever arm 15 of the sunshade clip 20 has a magnetic polarity opposite to that of the corresponding spectacles magnet 61 at the rear surface 60R of the coupling member 60 of the spectacles 50.

Consequently, when the sunshade clip 20 is not pivoted upward, the first clip magnet 11 embedded in the actuating member 10 of the sunshade clip 20 comes into contact with the corresponding spectacles magnet 61 at the front surface 60F of the coupling member 60 of the spectacles 50 by means of the magnetic attraction between the first clip magnet 11 and the corresponding spectacles magnet 61.

Similarly, when the sunshade clip 20 is pivoted upward, the second clip magnet 12 embedded in the lever arm 15 of the sunshade clip 20 comes into contact with the corresponding spectacles magnet 61 at the front surface 60R of the coupling member 60 of the spectacles 50 by means of the magnetic is attraction between the second clip magnet 12 and the corresponding spectacles magnet 61.

The aforesaid magnetic contacts between the first clip magnet 11 and the corresponding spectacles magnet 61 and between the second clip magnet 12 and the corresponding spectacles magnet 61 are alternately performed about the lever face 65 in a seesaw fashion.

To attach the sunshade clip 20 to the spectacles 50 as shown in FIG. 2 when the sunshade clip 20 is detached from the spectacles 50 as shown in FIG. 1, a user brings the sunshade clip 20 close to the spectacles 50 in such a manner that the first clip magnet 11 of the sunshade clip 20 approaches the corresponding spectacles magnet 61 of the coupling member 60 of the spectacles 50. As a result, the sunshade clip 20 is easily attached Lo the spectacles 50 by means of the magnetic attraction between the first clip magnet 11 and the corresponding spectacles magnet 61.

At this time, the lever arm 15 attached to the top surface of the actuating member 10 serves as a hooked portion for preventing the sunshade clip 20 from coming off the spectacles 50, so that the sunshade clip 20 can be securely attached to the spectacles 50 without shaking.

When a user of the sunshade clip 20 for the spectacles 50 according to the present invention goes into a dark or dimly lit place or intensity of illumination changes while the sunshade clip 20 is attached to the spectacles 50 as shown in FIG. 7, he/she may not want to use the sunshade clip 20. In this case, the user grasps the sunshade clip 20 and lifts it upward.

At this time, a gap between the first clip magnet 11 embedded in the actuating member 10 of the sunshade clip 20 and the corresponding spectacles magnet 61 embedded in the coupling member 60 of the spectacles 50 is increased, and thus the magnetic attraction between the first clip magnet 11 and the spectacles magnet 61 is decreased.

As the actuating member 10 of the sunshade clip 20 is gradually pivoted upward about the lever face 65 as a fulcrum for the lever arm 15, the magnetic attraction between the second clip magnet 12 embedded in the lever arm 15 of the sunshade clip 20 and the corresponding spectacles magnet 61 embedded in the coupling member 60 of the spectacles 50 is increased.

Finally, the second clip magnet 12 comes into contact with the corresponding spectacles magnet 61 as shown in FIG. 8. Consequently, the sunshade clip 20 of the present invention is horizontally held above the spectacles 50 at a right angle to the spectacles 50, as shown in FIGS. 5 and 6.

When the user wants to use the sunshade clip 20 again, he/she grasps the sunshade clip 20 and pivots it downward. At this time, the first clip magnet 11 embedded in the actuating member 10 of the sunshade clip 20 comes into contact with the corresponding spectacles magnet 61 embedded in the coupling member 60 of the spectacles 50 by means of the reverse pivoting operation.

Consequently, it is possible to easily attach the sunshade clip 20 to the spectacles 50 and easily pivot it upward or downward just by one manipulation, thereby increasing a user's convenience and eliminating the need for an additional carrying case.

Each of the actuating member 10, the lever arm 15, and the coupling member 60 preferably has the shape as shown in the accompanying drawings, although they may have other shapes, respectively, as long as they are operated on the basis of the same operating principle.

In the sunshade clip according to the above-described embodiment of the present invention, each of the actuating members is provided at the rear part thereof with a magnet, each of the lever arms is provided at the lower part thereof with another magnet, and each of the coupling members has a spectacles magnet, which alternately makes contact with the magnet of each of the actuating members and the magnet of each of the lever arms, and which has a magnetic polarity opposite to that of the magnet of each of the actuating members and to that of the magnet of each of the lever arms, whereby the sunshade clip is pivoted upward or downward about the lever faces as the fulcrums for the lever arms, by means of increased magnetic attraction between the magnets of the lever arms of the sunshade clip and the corresponding spectacles magnets of the coupling members of the spectacles or between the magnets of the actuating members of the sunshade clip and the corresponding spectacles magnets of the coupling members of the spectacles.

It may be also considered, however, that one of the actuating member/lever arm and the coupling member is made of a metal attractable by the magnet, and the other has the magnet at the position corresponding to the actuating member/lever arm or the coupling member.

As apparent from the above description, the present invention provides a pivotable sunshade clip for spectacles, which can be easily pivoted upward and downward just by magnetic attraction between the corresponding magnets without any additional hinge structure, whereby the structure of the sunshade clip is simple and thus damage to the sunshade clip is effectively prevented. Furthermore, the upward and downward pivoting movement of the sunshade clip of the present invention can be reliably accomplished.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pivotable sunshade clip for spectacles having a pair of coupling members, the sunshade clip comprising:

a pair of lens frames;

a pair of actuating members attached to the lens frames, the actuating member being outwardly extended from outer ends of the lens frames, respectively; and a pair of lever arms attached to the actuating members, the lever arms being extended rearward from the actuating members at right angles to the actuating members, respectively, wherein:

each of the actuating members is provided at the rear part thereof with a magnet, the magnet being exposed to the rear surface of each of the actuating members;

each of the lever arms is provided at the lower part thereof with another magnet, the magnet being exposed to the lower surface of each of the lever arms; and each of the coupling members has a spectacles magnet penetrating from a front surface to a rear surface thereof, the spectacles magnet alternately making contact with the magnet of each of the actuating members and the magnet of each of the lever arms, the spectacles magnet having a magnetic polarity opposite to that of the magnet of each of the actuating members and to that of the magnet of each of the lever arms, whereby the sunshade clip is pivoted upward or downward about a pair of lever faces as fulcrums for the lever arms, by means of increased magnetic attraction between the magnets of the lever arms of the sunshade clip and the corresponding spectacles magnets of the coupling members of the spectacles or between the magnets of the actuating members of the sunshade clip and the corresponding spectacles magnets of the coupling members of the spectacles, each of the lever faces being formed on each of the coupling members, the lever arms being placed on the lever faces of the coupling members, respectively.

2. The sunshade clip as set forth in claim 1, wherein each of the spectacles magnets has two separated permanent magnet parts, one of the magnet parts being embedded in the coupling member near the front surface of the coupling member so that it makes contact with the magnet of each of the actuating members, the other of the magnet parts being embedded in the coupling member near the rear surface of the coupling member so that it makes contact with the magnet of each of the lever arms.

3. The sunshade clip as set forth in claim 1, wherein each of the lever arms is hooked at the top surface of each of the coupling members for serving as a hooked portion when the sunshade clip is pivoted upward or downward in a seesaw fashion.

4. The sunshade clip as set forth in claim 1, wherein one of the actuating member/lever arm and the coupling member is made of a metal attractable by the magnet, and the other has the magnet at the position corresponding to the actuating member/lever arm or the coupling member.

* * * * *